(No Model.)

W. W. FRANTZ.
SPITTOON.

No. 543,575. Patented July 30, 1895.

Witnesses:
L. C. Hills
E. A. Bond

Inventor:
Willis W. Frantz
by E. B. Stocking
Atty.

UNITED STATES PATENT OFFICE.

WILLIS W. FRANTZ, OF WAYNESBOROUGH, PENNSYLVANIA.

SPITTOON.

SPECIFICATION forming part of Letters Patent No. 543,575, dated July 30, 1895.

Application filed August 9, 1894. Serial No. 519,865. (No model.)

*To all whom it may concern:*

Be it known that I, WILLIS W. FRANTZ, a citizen of the United States, residing at Waynesborough, in the county of Franklin, State of Pennsylvania, have invented certain new and useful Improvements in Spittoons, of which the following is a specification, reference being had therein to the accompanying drawings.

This invention relates to certain new and useful improvements in spittoons; and it has for its objects, among others, to provide a simple, cheap, and durable spittoon in which the pan or receptacle is removably held and the funnel supported by resilient or yielding connections or devices which serve also as supports for the said pan or receptacle. The pan or receptacle and the funnel are so arranged relatively to the body of the spittoon as to leave a surrounding air chamber or space. The pan is supported a distance above the bottom of the body portion, and the device as a whole is arranged to rest upon the feet provided by the elastic supports for the funnel and pan. The spring-supports are attached to the body portion between their ends, otherwise being free and disconnected from the said body portion, so that any pressure upon the funnel cannot break the same or destroy its connection with the body portion, as is so often done where the funnel is connected with the body portion by solder or other firm connection. The pan or receptacle is removed from the under side of the spittoon and is easily replaced after being emptied of its contents. Thus only the said pan need be removed from the room, leaving the body portion and funnel with its spring-supports where they are not liable to be injured. Should the pan from continuous use become broken or no longer of use it can be replaced by a new one at a trifling cost.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1:
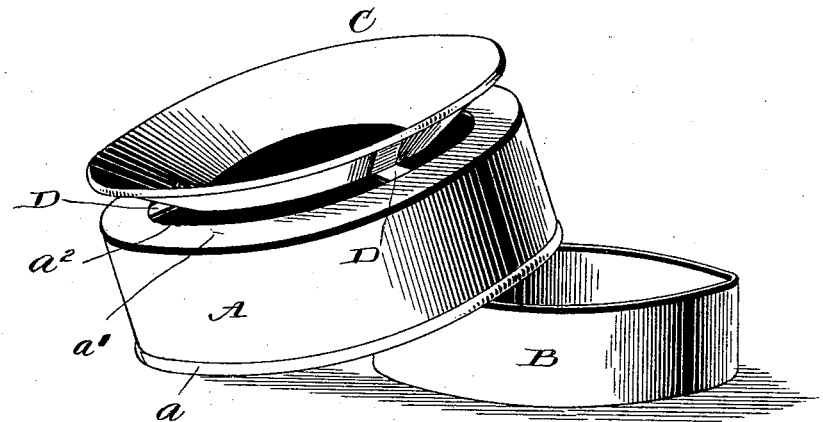
Figure 2:
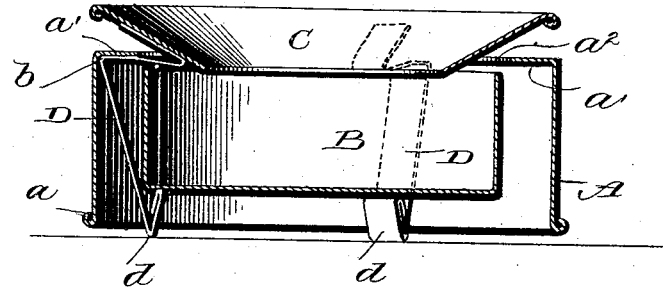
Figure 3:
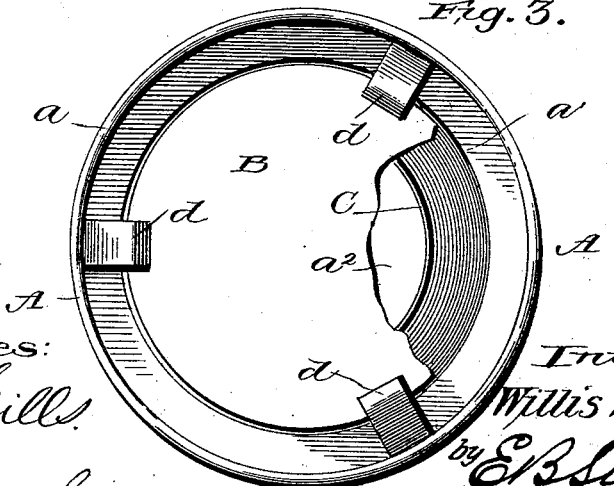

Figure 1 is a perspective view of my improved spittoon with the pan removed and the body portion shown resting thereon. Fig. 2 is a vertical section through the same. Fig. 3 is a bottom plan with a portion of the bottom of the pan broken away.

Like letters of reference indicate like parts throughout the several views.

Referring now to the details of the drawings by letter, A designates the rim or body portion, which may be of any suitable material and as ornamental in design as may be desired. In practice it will be usually made of brass, on account of its being practically indestructible in ordinary use, and is shown as having a bead or roll $a$ at its lower edge. At its upper edge it is provided with an inwardly-extending horizontal annular flange $a'$, leaving a central opening $a^2$.

B is the pan or receptacle of considerable less diameter and height than the rim or body portion, as shown in Fig. 2. This pan is designed to be removably held within the body portion, so as to be readily removed for the purpose of emptying and cleaning the same. This pan is the only part of the device which it is necessary to be removed from the compartment, and if it is destroyed it can be replaced at a trifling expense.

C is the funnel, the smaller and lower end of which is designed to extend within the opening in the top of the body portion or rim, as seen best in Fig. 2, and this funnel, instead of being soldered to the body portion, is supported upon the free ends of spring-strips D, which are secured to the under side of the flange $a'$ of the body portion, the free ends to which the tapered wall of the funnel is secured being inclined outward and parallel with the outer wall of the funnel, as shown in Fig. 2, and secured thereto by solder or in any other suitable manner. There may be more or less of these spring-strips. In this instance I have shown four, and in practice find such number sufficient.

The spring-strips from their points of connection $b$ with the body portion extend downward and slightly inward toward the center, as seen best in Fig. 2, and extend slightly below the bottom edge of the rim, as seen in Fig. 2, so as to support the said rim a short distance above the floor or other support and permit of a circulation of air beneath the same and the pan. The lower ends of the spring-strips are turned upward at an incline, as shown, to provide the lugs or rests $d$ to support the pan, as shown. When it is desired to remove the pan all that is necessary is to press outward any two of the lower ends of the strips, when the pan can be withdrawn, and it may be easily replaced, the incline of the lower ends of the strips allowing it to be readily pushed upward until the lugs are passed, when the strips spring inward and the lugs or rests engage beneath the bottom of the pan and hold the same, as shown in Figs. 2 and 3.

Lime or any other desired absorbent may be placed in the pan, the concealed opening around and beneath the funnel providing for a free circulation of air over the lime in the pan, thus utilizing the well-known purifying and absorbent properties of the lime for the abstraction of noxious gases from the atmosphere of the apartment.

Modifications in detail may be resorted to without departing from the spirit of the invention or sacrificing any of its advantages.

In spittoons designed for use by consumptives I may employ a paper funnel in the top of the brass one, which may be removed and burned each evening, or as often as desired, and in some cases I may use a glass funnel in lieu of the paper one. In some cases the springs and feet may be made separate instead of in a single piece, as shown.

What I claim as new is—

1. A spittoon comprising a body portion a removable pan, a funnel independent of both the body portion and pan and yielding means attached between its ends to the body portion one end being connected with the funnel and the other formed to support the pan, substantially as specified.

2. A spittoon comprising a body portion, a removable pan, a funnel independent of both the body portion and pan and yielding means attached between its ends to the body portion one end being connected with the funnel and the other extended below the bottom of the body portion being constructed to support the pan, substantially as specified.

3. A spittoon comprising a body portion with annular inwardly-extending flange at its upper end with an opening, a funnel disconnected from the body portion, and extending into said opening, spring strips secured to the body portion beneath said flange, with their upper ends inclined and secured to the funnel, with an opening surrounding the lower end of the funnel, and a removable pan supported on said strips which extend below the lower edge of the body portion to provide a surrounding space, substantially as specified.

4. A spittoon comprising a body portion, spring strips extending above and below the same, a funnel having its lower portion of less diameter than the upper part of the body portion and secured to the upper ends of said strips and a removable pan supported upon said strips beneath the funnel, substantially as shown and described.

In testimony whereof I affix my signature in presence of two witnesses.

WILLIS W. FRANTZ.

Witnesses:
H. E. GEISER,
ALF. N. RUSSELL.